United States Patent [19]

Agius et al.

[11] Patent Number: 4,898,504

[45] Date of Patent: Feb. 6, 1990

[54] KEY CUTTING MACHINE

[76] Inventors: Frank P. Agius; Darrell E. Sims, both of 909 Washington St., Alpina, Mich. 49707

[21] Appl. No.: 277,778

[22] Filed: Nov. 30, 1988

[51] Int. Cl.⁴ ............................................. B23C 01/16
[52] U.S. Cl. ..................................... 409/81; 409/218; 76/110; 51/100 R
[58] Field of Search ...................... 409/81, 82, 218, 83; 76/110; 82/153, 154, 156; 29/65; 408/14; 51/2 C, 100 R

[56] References Cited

U.S. PATENT DOCUMENTS

| | | | |
|---|---|---|---|
| 1,750,218 | 3/1930 | Falk | 409/82 |
| 1,889,461 | 11/1932 | Hansen | 409/82 X |
| 1,948,260 | 2/1934 | Fowler | 409/82 X |
| 2,032,820 | 3/1936 | Turrell | 409/81 |
| 2,329,269 | 9/1943 | Jacobi | 409/81 |
| 2,556,577 | 6/1951 | Drake | 82/156 X |

FOREIGN PATENT DOCUMENTS

| | | | |
|---|---|---|---|
| 1174884 | 3/1959 | France | 409/81 |
| 4714559 | 5/1972 | Japan | 76/110 |
| 30359 | 12/1903 | Switzerland | 408/241 S |

Primary Examiner—Z. R. Bilinsky
Assistant Examiner—Robert Schultz
Attorney, Agent, or Firm—Harpman & Harpman

[57] ABSTRACT

A key cutting machine capable of duplicating a key blank from a master key and cutting a key blank to form a desired key from a lock manufacturer's code or number governing the depths of the cuts and the spaces between them being formed in the key blank. The key cutting machine having a plurality of interchangeable discs each of which has a plurality of depth cut-outs arranged circumferentially on one of its sides corresponding with the key cut-out depths specified by various key and lock manufacturers and having a plurality of interchangeable spacing keys, each of which has a plurality of longitudinally spaced configurations arranged in various different patterns in accordance with various key and lock manufacturer's code or identifying number.

5 Claims, 3 Drawing Sheets

KEY CUTTING MACHINE

BACKGROUND OF THE INVENTION

1. Technical Field

This invention relates to key cutting machines capable of duplicating a master key by appropriately cutting a key blank and forming a key for use in a particular lock by utilizing devices controlling the spacing of the cuts in a key blank and the depth of the cuts in accordance with a lock and key manufacturer's code.

2. Description of Prior Art

Prior machines of this type are illustrated and described in U.S. Pat. Nos. 1,750,218 to M. Falk, 1,889,461 to H. Hansen and 1,948,260 to F.E. Fowler.

The Falk patent in its preferred embodiment utilizes two discs 34 and 35, one of these controlling transverse movement of the blank with respect to the cutter of the machine and the other disc controlling movement toward and away from the cutter wheel. A modification shown in FIG. 6 of the patent utilizes a single disc having a cam applied to one side thereof.

The Hansen patent utilizes an elongated bar which is slideable transversely of the machine, one end of the bar having a plurality of notches arranged on an angular plane and a series of apertures are formed in longitudinally spaced relation in the other end of the bar. The position of a key blank to be cut being controlled by means on the machine engaging the notches and the apertures in the elongated bar.

The Fowler patent utilizes two so called plates, one of which has a plurality of notches arranged in an angular plane along one edge and controls the depth of the cut to be made in a key blank and a spacing key having a plurality of notches spaced longitudinally therein controls the spacing of the cuts.

The present invention discloses a key cutting machine incorporating the usual rotary cutter and means movable toward and away and transversely of the rotary cutter in which one or more keys or key blanks can be positioned. The principle novelty in the present invention is the provision of a device incorporating removable and replaceable discs, each of which has a plurality of circumferentially spaced different depth cut-outs formed in one side thereof and means registrable with the cut-outs controlling the position of the key blank being cut with respect to the spacing of the cuts being formed in the key blank and the depth of the cuts.

SUMMARY OF THE INVENTION

A key cutting machine comprising a base having a rotary cutter mounted thereon and a yoke pivotally and slideably positioned thereon with clamps on the yoke for holding keys and/or key blanks so arranged that a key blank in one of the keys can be moved toward and away and transversely with respect to the rotary cutter. A device is positioned on the base with a guide engageable in a spacer key positioned in the remaining clamp, the guide being movable toward and away from the spacer key be a parallel pin one end of which is engageable in depth cut-outs in a disc rotatably positioned with respect thereto whereby the single guide engaging the spacer key in the yoke control both the spacing and the depth of the cuts being made in the key blank. The guide and cutter are on parallel planes.

DESCRIPTION OF THE PREFERRED EMBODIMENT

Figures 1, 2:
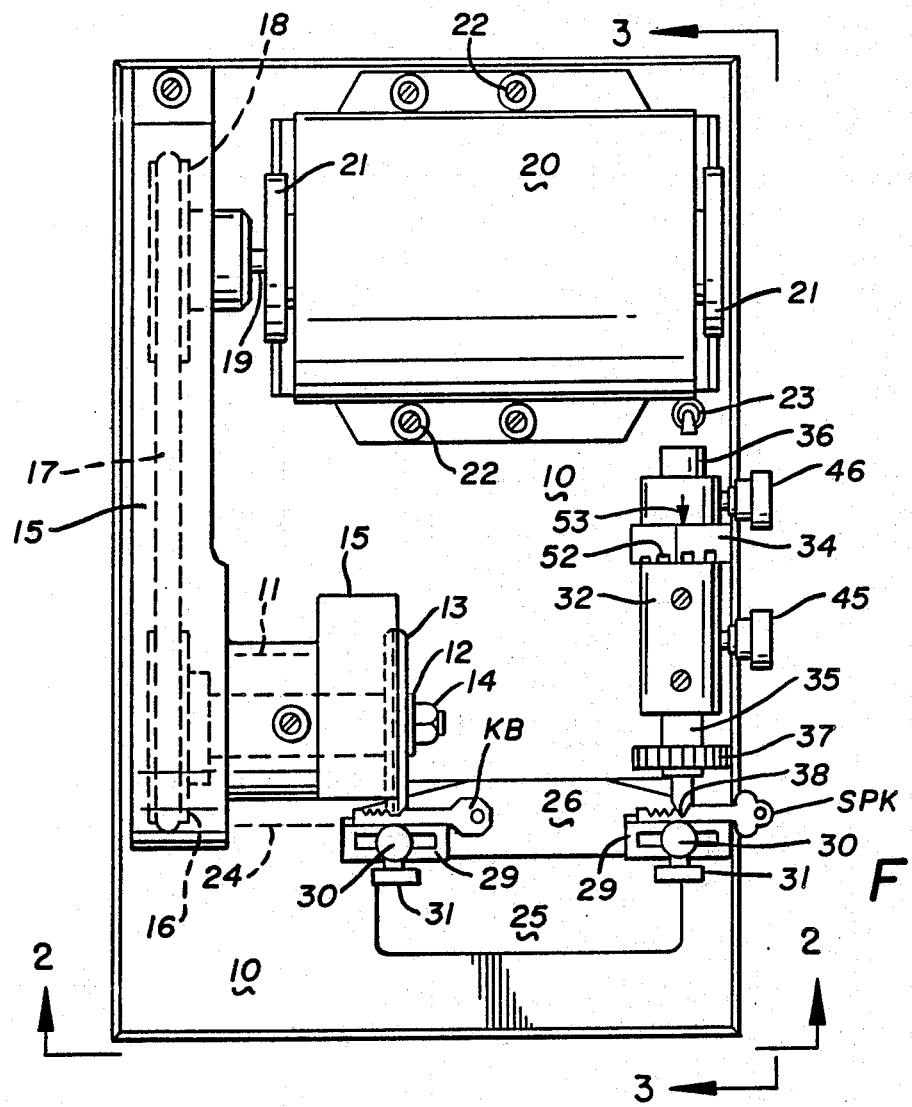
FIG. 1 is a top plan view of the key cutting machine.
FIG. 2 is an end elevation on line 2—2 of FIG. 1.
Figures 3, 4, 5, 6:
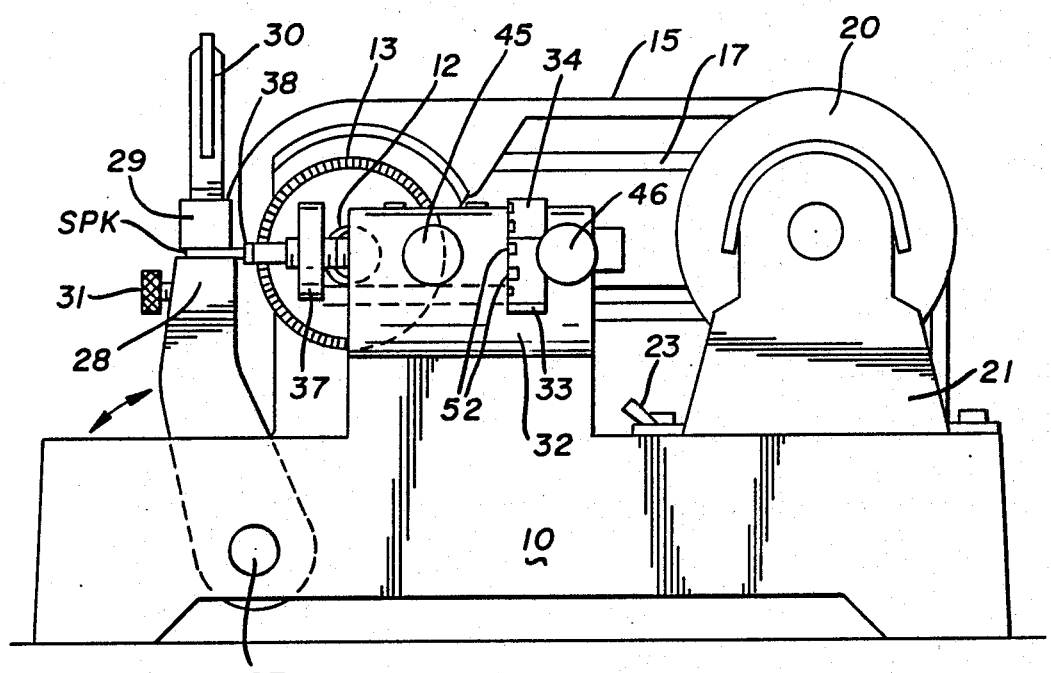
FIG. 3 is a side elevation one line 3—3 of FIG. 1.
FIG. 4 is a horizontal section on line 4—4 of FIG. 2 in enlarged detail.
FIG. 5 is an enlarged section on line 5—5 of FIG. 4.
FIG. 6 is an enlarged perspective view of a disc having a plurality of depth cut-outs of different sizes in one side thereof.

By referring to the drawings and FIGS. 1, 2 and 3 in particular, it will be seen that a rectangular base 10 has an upstanding journal 11 positioned thereon in which a shaft 12 is rotatably positioned. A rotary cutter 13 is secured to one end of the shaft 12 by a fastener 14 and is partially covered by a housing 15 positioned on and partially supported by the journal 11. The other end of the shaft 12 has a pulley 16 thereon over which a drive belt 17 is trained. The drive belt 17 is also trained over a secondary pulley 18 positioned on the drive shaft 19 of an electric motor 20 which is supported by the upstanding ends of a bracket 21 which in turn is secured to the base 10 by fasteners 22. A switch 23 positioned in an aperture in the base 10 controls on an electric circuit for energizing the electric motor 20. Still referring to FIGS. 1, 2 and 3 of the drawings, it will be seen that there is a transverse secondary shaft 24 positioned in the base 10 which is hollow and that there is a cut-away area 25 in the upper portion of the base 10 so that a yoke 26 and more particularly its lower portion which is transversely apertured as at 27 will slideably register with the secondary shaft 24 so as to be capable of transverse movement therealong with respect to the base 10. The upper portion of the yoke 26 is bifurcated and each of the portions thereof has a fixed jaw 28 and a movable jaw 29 and an upstanding clamping arm 30 which when rotated will move the clamping jaw 29 toward the fixed jaw 28 so as to secure a key blank KB and a spacing pattern key SPK respectively to the upper bifurcated portions of the yoke 26, set screws 31 positioned in threaded apertures in the upper portions of the yoke 26 are provided to engage the rotatable clamp arms 30 to hold the same in clamped position. Still referring to FIGS. 1, 2 and 3 of the drawings, it will be seen that a body member 32 which may be formed integrally with the base 10 and in elevated relation to the same has a transverse slot 33 therein in which a disc 34 is removably positioned. A movable guide 35 extends out of one end of the body member 32 and a disc supporting member 36 extends out of the other end thereof. A depth adjustment ring 37 threadably engages a portion of the movable guide 35 and the outer end of the movable guide 35 is pointed as at 38 to engage the spacer key SPK and more particularly the configurations therein.

The body member 32, the disc 34, the movable guide 35 and the disc supporting member 36 are best illustrated in the enlarged details comprising the horizontal section of FIG. 4 and the vertical section of FIG. 5 and by referring thereto it will be seen that the body member 32 has a longitudinal bore 39 therein in which a longitudinally slotted bushing 40 is positioned and which in turn slideable receives the movable guide 35 which is keyed in the slot thereof of a key 41. It will be seen that the depth adjustment ring 37 positioned on the threaded portion of the movable guide 35 is spaced outwardly from the first end of the body member 32 and that the opposite end of the movable guide 35 has a circumferential groove in which a snap ring 42 is positioned so as to engage one end of the bushing 40. It will also be seen that the disc supporting member 36 has a hollow inner end portion 43 and that the solid outer end portion has surface knurling 44 thereon to facilitate manual movement of the same in the longitudinal bore 39 which is necessary to permit the disc 34 to be initially positioned in the transverse slot 33 of the body member 32 and removed therefrom when similar discs with different circumferentially spaced depth cut-outs as hereinafter described are substituted therefor.

By referring to FIG. 4 of the drawings, it will be seen that a pair of set screws 45 and 46 respectively are positioned in threaded apertures in the body member 32 and positioned so that the inner end of the set screw 45 will engage an aperture in the bushing 40 so as to hold the same in desired location. It will be observed that the outer pointed end 38 of the guide rod is preferably precision ground to the exact configuration of the rotary cutter of the key cutting machine as to the width of the flat peripheral edge of the rotary cutter and the angle of the adjacent sides thereof. It will also be observed that the key 41 in the movable guide 35 which engages the longitudinal slot 47 in the bushing 40 ensures that the shaped end 38 of the movable guide 35 always properly engages the configurations in the spacer key SPK so as to ensure the proper shape of the cut being formed by the rotary cutter 13 in the key blank KB.

The set screw 46 is positioned in a threaded aperture in the body member 32 so that its inner end will engage and hold the disc supporting member 36 in the position illustrated and that it will release the disc supporting member 36 upon being rotated in a counter-clockwise direction when it is necessary to move the disc supporting member 36 out of the slot 33 in the body member 32 so that the disc 34 can be removed and another disc positioned in the device.

Figure 7:
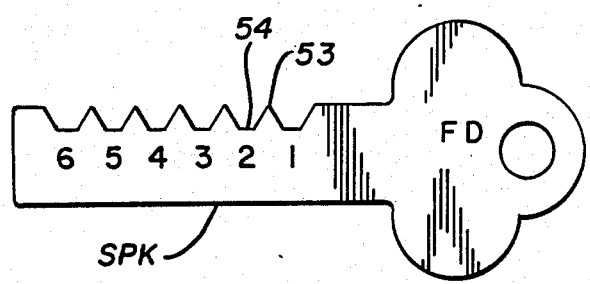
FIG. 7 is an enlarged plan view of a spacing key having a spacing configuration corresponding with a lock and key manufacturer's code.

By referring now to the vertical section comprising FIG. 5 of the drawing, it will be seen that there is a secondary bore 48 in the body member 32 below the longitudinal bore 39 and that the inner end of the secondary bore 48 is of reduced diameter as at 49 where it communicates with the transverse slot 33 in which one of the discs 34 is positioned. A depth guide pin 50 is slideable positioned in the secondary bore 48, the inner end of the depth guide pin 50 being of smaller diameter so as to enable a spring 51 to be positioned thereabout so as to normally urge the depth guide pin 50 outwardly, to the left as seen in FIG. 5, so as to bring the outer end thereof against the depth adjustment ring 37. The opposite inner end of the depth guide pin 50 is moveable inwardly against the disc 34 and into one of a plurality of depth cut-outs 52 therein. One of the discs 34 is seen in enlarged perspective detail in FIG. 6 of the drawings and by referring thereto it will be seen that each of the depth cut-outs 52 is circumferentially spaced in a side of the disc 34 and each is of a different depth and the different depth cut-outs are arranged in groups of cut-outs 52 of different depths corresponding with various manufacturers individual key cutting requirements. In a preferred embodiment, each of the discs 34 has 16 depth cut-outs and depending on the number of depth cut-outs necessary to accomodate the various key manufacturer's depth cut requirements, each disc 34 can accomodate several groups of different depth cut-outs 52 corresponding with the several manufacturers requirements. Indicia on the periphery of the disc 34 locates the groups and identifies them as to the manufacturer of the lock for which the key is being cut, for example, as illustrated in FIG. 6 of the drawings the group carrying the manufacturers identification insignia FD includes four numbered different depth cut-outs 52 and assuming the particular lock pattern for which the key is being cut requires four different depth cut-outs and the manufacturers code number could be, for example, 231432 which would indicate six different cuts in the key blank KB progressively spaced longitudinally of the key from the shoulder of the key blank as determined by the spacing on the spacer key SPK as seen in FIGS. 1 and 7 of the drawings. In FIG. 1 of the drawings, it will be seen that a guide mark 53 is located on the upper surface of the inner portion of the body member 32 for selective registry with the indicia on the uppor portion of the disc 34 when it is rotatably positioned in the transverse slot 33 in the body member 32. By referring to the vertical section comprising FIG. 5 of the drawings, it will be seen that the depth cut-out 52 in the disc 34 that is positioned for engagement with the inner end of the depth guide pin 50 is thus oppositely disposed with respect to the indicia on the upper surface of the disc 34 so that the actual dept cut-out 52 indicated by the indicia on the upper surface of the disc 34 when it is in the position illustrated in the drawings actually refers to the oppositely disposed depth cut-out 52 that engages the inner end of the depth guide pin 50.

Those skilled in the art will observe that each group of depth cut-outs hereinbefore referred to in connection with FIG. 6 of the drawings include a number one depth cut-out and that all such number one depth cut-outs are exactly the same depth dimension. This is common to each group so that no matter what disc is used in the key cutting machine, the number one setting can be used to duplicate keys as hereinafter described and that the starting depth cut for any key blank is predetermined and cut on the spacing key SPK that will be used for each group. The spacing key is cut to a height that is the highest cut for the particular manufacturers series.

By referring now to FIG. 7 of the drawings, an enlarged plan view of a spacing key SPK may be seen and it will be observed that the plurality of peaks 53 are sharp and the valleys 54 therebetween are flat and that the peaks are evenly spaced longitudinally in one longitudinal edge of the spacing key SPK. Indicia on the spacing key SPK defines six spacing positions for the cuts to be made in the key blank being cut and those skilled in the art will observe that different manufacturers of locks and keys therefore sometimes vary the number of longitudinally spaced cuts in the key as well as the depth of the individual cuts.

By referring now to FIGS. 4 and 5 of the drawings, it will be observed that one of the discs 34 is illustrated in position in the transverse slot 33 of the body member 32 and that an annular groove is formed in the side of the disc 34 opposite the side carrying the depth cut-outs 52 and that a spring washer 56 is disposed in the annular groove in the disc 34 and arranged to urge the disc 34 toward the depth guide pin 50.

In using the key cutting machine of the present invention in cutting a key blank from a manufacturers code, the following steps are taken. As seen in FIG. 1 of the drawings a key blank KB is positioned in the clamp on the left hand side of the yoke 26 where it is held by the jaws 28 and 29 which are moved by the clamp arm 30. It is positioned so that the shoulder of the key blank is against one side of the jaws 28 and 29 as best seen in FIG. 1. A spacer key SPK having a manufacturers indicia thereon is positioned in the right hand clamp of the yoke 26 and the jaws 28 and 29 engaged thereon by the clamp arm 30. A disc 34 having the manufacturers indicia matching that of the key blank KB is installed in the transverse slot 33 in the body member 32 by loosening the set screw 46 and moving the disc supporting member 36 to the right thereof as seen, for example, in FIG. 4 of the drawings whereupon the disc 34 can be dropped into position and the center opening therein engaged by moving the disc support member 36 to the left and the set screw 46 retightened. The disc 34 with its plurality of depth cut-outs 52 is rotatable in a controlled manner due to the presence of the spring washer 56. The movable guide 35 and its shaped end 38 is moved into engagement with the first position on the spacer key SPK which has along with the key blank KB been moved into the upright position as shown in FIG. 3 of the drawings by the manual adjustment of the yoke 26. The movable guide 35 and more particularly its desirably shaped end 38 having beenmoved into engagement with the first position of the spacer key SPK by rotation of the depth adjustment ring 37 so that its innermost end has moved into engagement with a depth cut-out 52 in the disc 34 as indicated by the indicia on the periphery of the disc 34 having been positioned in alignment with the marker 53 on the upper surface of the body member 32. The yoke 26 is then moved manually so as to move the key blank KB against the rotary cutter 13 which is being rotated by the electric motor 20 so as to make the first cut in the key blank. The spring mounting of the depth guide pin 50 permits the same to move before the key blank is moved against the rotary cutter thus maintaining the movable guide 34 and more particularly its shaped end 38 in position in the spacer key SPK both before and during the actual cut being made in the key blank KB. The same procedure is followed until all of the cuts are made and the key is finished, it being necessary to partially rotate the disc 34 to line up the successive indicia numbers that correspond with the manufacturers key code numbers for that particular key.

It will thus be seen that a novel and efficient key cutting machine has been disclosed and wherein the provision of the discs 34 with their plurality of different depth cut-outs in one face thereof arranged in groups makes possible a rapid and efficient and fool proof cutting of the key blank to a predetermined manufacturers code.

Figure 8:
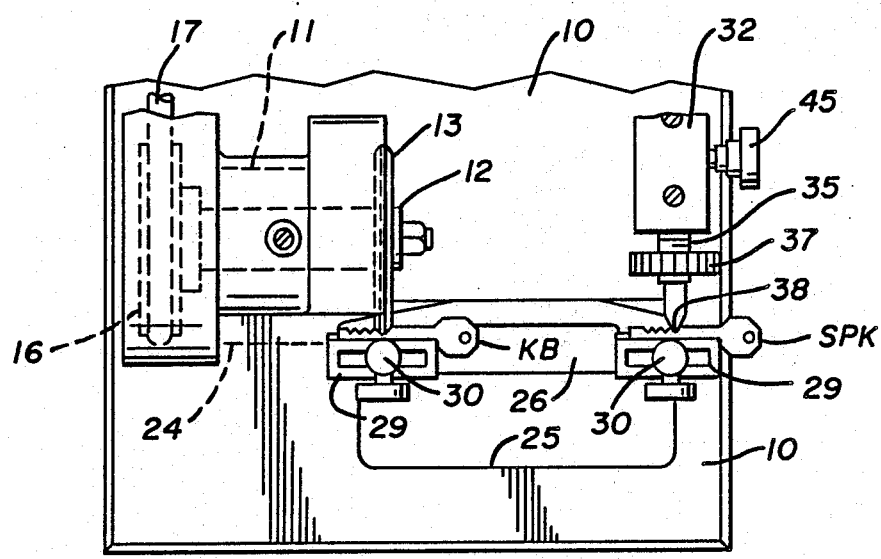
FIG. 8 is a top plan view of a portion of the key cutting machine illustrated in FIG. 1 showing a key blank and a pattern key positioned therein for conventional key duplicating.

It will occur to those skilled in the art that the key cutting machine of the prsent invention may also be advantageously used in duplicating an existing key which is used as a pattern. By referring to FIG. 8 of the drawings, an end portion of the key cutting machine hereinbefore described and illustrated in FIG. 1 of the drawings may be seen and it will be observed that the base 10 is the same as in the hereinbefore described embodiment of the invention. The key cutting machine of FIG. 8 having the same yolk 25 and the jaws 28 and 29 and the clamping arms 30 by which a key blank KB and a pattern key PK may be positioned in the same manner as the key blank KB and the spacing key SPK in the embodiment of the invention hereinbefore described. The same rotary cutter 13 is present and the elongated body member 32 with its movable guide 35 becomes an important part of the device when duplicating an existing or pattern key as the shpaed outer end of the movable guide 35 is used to accurately engage and thus follow the pattern key to be duplicated while the yolk and the opposite clamp or vice carries the key blank being cut and ensures a more accurate key duplication than many of the key cutting machines in the prior art.

Although, but one embodiment of the present invention has been illustrated and described it will be apparent to those skilled in the art that various changes and modifications may be made therein without departing from the spirit of the invention and having thus described our invention,

What we claim is:

1. In a key cutting machine of the type having a base, a rotary cutter, a yoke movably supported on the base having a pair of clamps thereon for holding a spacing key and a key blank, an improved guiding apparatus, the improved guiding apparatus comprising: a body member having a transverse opening, said body member being on said base and having two spaced apart bores, with both bores being in spaced parallel relation to a plane containing said rotary cutter, a guide disc having a plurality of different depth cut-outs in an annular pattern on one side thereof, means for rotatably removably positioning said guide disc in said transverse opening in said body opening, a movable guide axially movable in one bore of said two spaced apart bores and having a spahed end protruding from said one bore for engagement with said spacing key, an adjustment ring adjustably positioned on said movable guide for movement axially of said movable guide, and a depth guide pin in the other bore of said two spaced apart bores in said body member having one end engaging said depth cut-outs in said disc and an opposite end engaging said adjustment ring, a resilient biasing means on said depth guide pin and located in said other bore and engaging said body member adjacent to said other bore for biasing said depth guide pin into engagement with said adjustment ring whereby said key blank may be guided toward said rotary cutter so as to cut said key blank in longitudinally spaced areas corresponding with said spacing key and to depths matching the depths of said cut-outs in said disc.

2. The improved guiding apparatus in a key cutting machine according to claim 1 and wherein said rotary cutter is disc shaped and has a rotary axis which is perpendicular to said plane, and said body member is elevated with respect to said base, the one bore and said movable guide in said one bore being contained in a horizontal plane which is common with the axis of said rotary cutter.

3. The improved guiding apparatus in a key cutting machine according to claim 1 and wherein said means rotatably positioning said disc comprises a support member movably positioned in said one bore for movement across said transverse opening in said body member in which said disc is positioned.

4. The improved guiding apparatus in a key cutting machine according to claim 1 and wherein a bushing having a longitudinal slot therein is positioned in said one bore in said body member and said movable guide is positioned in said slotted bushing and a key is received in said slot.

5. The improved guiding apparatus in a key cutting machine according to claim 1 and wherein said disc having the plurality of different depth cut-outs in an annular pattern on one side thereof is of an overall width at least double the depth dimension of any one of said plurality of different depth cut-outs therein and wherein indicia on the peripheral edge of said disc identifies each of the plurality of different depth cut-outs and indicia on the peripheral edge of said disc identifies groups of said different depth cut-outs as relating to lock and key manufacturer's codes for duplicating keys.

* * * * *